(12) United States Patent
Numata

(10) Patent No.: US 11,637,969 B2
(45) Date of Patent: Apr. 25, 2023

(54) IMAGING DEVICE, IMAGING SYSTEM, NON-TRANSITORY STORAGE MEDIUM, AND CONTROL METHOD

(71) Applicant: CANON KABUSHIKI KAISHA, Tokyo (JP)

(72) Inventor: Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/834,275

(22) Filed: Mar. 30, 2020

(65) Prior Publication Data
US 2020/0336677 A1    Oct. 22, 2020

(30) Foreign Application Priority Data
Apr. 18, 2019   (JP) .............................. JP2019-079524

(51) Int. Cl.
*H04N 5/265*    (2006.01)
*H04N 23/45*    (2023.01)
(Continued)

(52) U.S. Cl.
CPC ............. *H04N 5/265* (2013.01); *H04N 23/45* (2023.01); *H04N 23/56* (2023.01);
(Continued)

(58) Field of Classification Search
CPC ............. H04N 5/265; H04N 5/232939; H04N 5/2256; H04N 5/2258; H04N 5/2351; H04N 5/2354
See application file for complete search history.

(56) References Cited

U.S. PATENT DOCUMENTS 6,784,935 B1   8/2004 Uya et al.
7,750,278 B2   7/2010 Oike et al.
(Continued)

FOREIGN PATENT DOCUMENTS

CN    102461156 A    5/2012
CN    102823234 A    12/2012
(Continued)

OTHER PUBLICATIONS

Dec. 23, 2021 Chinese Official Action in Chinese Patent Appln. No. 202010305074.1.
(Continued)

*Primary Examiner* — Hesham K Abouzahra
(74) *Attorney, Agent, or Firm* — Venable LLP

(57) ABSTRACT

An imaging device capable of increasing a dynamic range of an image while minimizing a decrease in image quality when capturing is performed under low illuminance. An imaging device includes: a first imaging element (103) having sensitivity to visible light and configured to output a first image signal (107); a second imaging element (104) having sensitivity to infrared light and configured to output a second image signal (108A) and a third image signal (108B) acquired under an exposure condition different from that of the second image signal (108A) at a second frame rate higher than a first frame rate of the first imaging element (103); and a combination processor configured to generate a combination including the first image signal (107) output from the first imaging element (103) and the second image signal (108A) and the third image signal (108B) output from the second imaging element (104) and generate a fourth image signal (109).

25 Claims, 10 Drawing Sheets

(51) Int. Cl.
 *H04N 23/56* (2023.01)
 *H04N 23/71* (2023.01)
 *H04N 23/74* (2023.01)
 *H04N 23/63* (2023.01)

(52) U.S. Cl.
 CPC ........... *H04N 23/633* (2023.01); *H04N 23/71* (2023.01); *H04N 23/74* (2023.01)

(56) References Cited

U.S. PATENT DOCUMENTS

| | | | |
|---|---|---|---|
| 8,749,635 | B2 | 6/2014 | Högasten et al. |
| 9,077,915 | B2 | 7/2015 | Kolstad et al. |
| 9,083,897 | B2 | 7/2015 | Högasten et al. |
| 10,880,498 | B2 * | 12/2020 | Tokizaki ............... H04N 5/2258 |
| 2008/0173794 | A1 | 7/2008 | Oike et al. |
| 2010/0309315 | A1 | 12/2010 | Högasten et al. |
| 2011/0249014 | A1 * | 10/2011 | Kolstad ................. H04N 5/332 345/589 |
| 2012/0154596 | A1 * | 6/2012 | Wajs ...................... G06T 5/002 348/164 |
| 2013/0342691 | A1 | 12/2013 | Lewis et al. |
| 2014/0285672 | A1 | 9/2014 | Högasten et al. |
| 2016/0363451 | A1 * | 12/2016 | Zhang .................... B64G 1/244 |
| 2019/0212261 | A1 * | 7/2019 | Lannestedt ........... G01J 3/0208 |
| 2020/0074614 | A1 * | 3/2020 | Safai ................. H04N 5/23229 |

FOREIGN PATENT DOCUMENTS

| | | | | |
|---|---|---|---|---|
| CN | 103292909 | A | | 9/2013 |
| CN | 109194873 | A | | 1/2019 |
| CN | 109429001 | A * | 3/2019 | ......... H04N 5/23229 |
| CN | 109429001 | A | | 3/2019 |
| JP | 2000-138868 | A | | 5/2000 |
| JP | 2007-214832 | A | | 8/2007 |
| JP | 2013-247492 | A | | 12/2013 |

OTHER PUBLICATIONS

Jan. 17, 2023 Japanese Official Action in Japanese Patent Appln. No. 2019-079524.

* cited by examiner

IMAGING DEVICE, IMAGING SYSTEM, NON-TRANSITORY STORAGE MEDIUM, AND CONTROL METHOD

BACKGROUND OF THE INVENTION

Field of the Invention

The present invention relates to an imaging device and a control method thereof.

Description of the Related Art

In imaging devices for performing monitoring and the like, acquiring clear subject images is required even at the time of low illuminance such as at night. As imaging devices capable of acquiring clear subject images even at the time of low illuminance, imaging devices which (a) include imaging elements having sensitivity to infrared light in addition to imaging elements having sensitivity to visible light and (b) combine images acquired using these two imaging elements and display the combined image have been proposed.

Japanese Patent Laid-Open No. 2013-247492 describes changing synthesis parameters for combining a visible image and a far-infrared image in accordance with the detection results for the surrounding environment, combining the visible image with the far-infrared image using the changed parameters, and generating a combined image.

Also, in imaging devices for performing monitoring and the like, acquiring clear subject images is also required even in a scene in which a bright part and a dark part are present together. Japanese Patent Laid-Open No. 2000-138868 proposes an imaging device which increases a dynamic range of images by acquiring images of a plurality of frames having different accumulation times and combining the images of the plurality of frames.

However, in Japanese Patent Laid-Open No. 2013-247492, overexposure and underexposure can occur because a dynamic range is narrow. On the other hand, since Japanese Patent Laid-Open No. 2000-138868 describes countermeasures against such problems, but does not include an imaging element having sensitivity to infrared light, it is difficult to acquire a subject image at the time of low illuminance.

SUMMARY OF THE INVENTION

Thus, an object of the present invention is to provide an imaging device capable of increasing a dynamic range of an image while minimizing a decrease in image quality when imaging is performed under low illuminance.

An imaging device includes: a first imaging element having sensitivity to visible light and configured to output a first image signal; a second imaging element having sensitivity to infrared light and configured to output a second image signal and a third image signal acquired under exposure conditions different from those of the second image signal at a second frame rate higher than a first frame rate of the first imaging element; and a combination processor configured to generate a combination including the first image signal output from the first imaging element and the second image signal and the third image signal output from the second imaging element and generate a fourth image signal.

Further features of the present invention will become apparent from the following description of exemplary embodiments with reference to the attached drawings.

DESCRIPTION OF THE EMBODIMENTS

Figure 1:
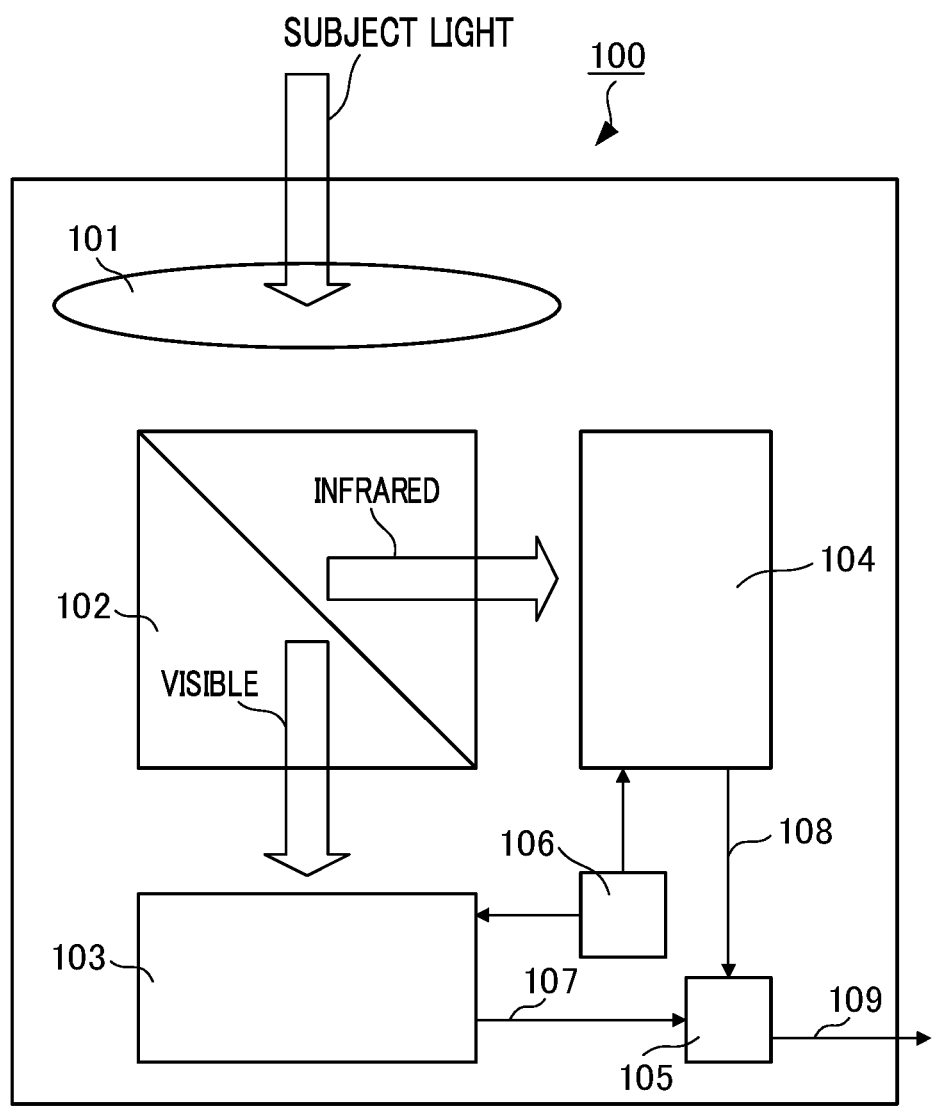
FIG. 1 is a schematic diagram illustrating a configuration of an imaging device according to the first embodiment.

An imaging device in embodiments of the present invention will be described below with reference to the drawings. At this time, constituent elements having the same function in all of the drawings will be denoted with the same reference numerals and their repeated description will be omitted.

First Embodiment

FIG. 1 illustrates an imaging device in the first embodiment. FIG. 1 is a schematic diagram illustrating a configuration of an imaging device 100 according to the first embodiment. The imaging device 100 includes an imaging optical system 101, a light separating unit 102, a first imaging element 103, a second imaging element 104, a combination processor 105, and the controller 106.

The light separating unit 102 separates light passing through the imaging optical system 101 so as to make incident on the first imaging element 103 and the second imaging element 104. To be specific, the light separating unit 102 is constituted of a wavelength selection prism and is configured so that light having a wavelength shorter than a wavelength with a predetermined threshold value (visible light) is transmitted through the wavelength selection prism and light having a wavelength longer than a wavelength with the predetermined threshold value (infrared light) is reflected by the wavelength selection prism. Here, the term "transmitted/reflected" means that 80% or more of light is transmitted/reflected.

Figure 2:
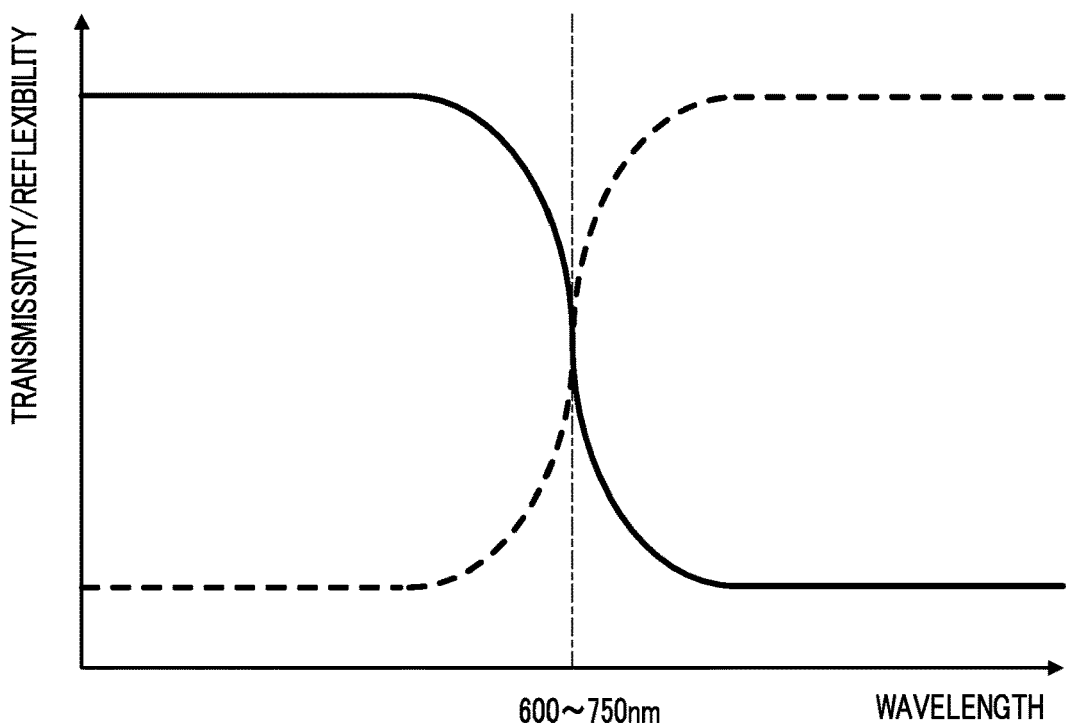
FIG. 2 is a spectrum distribution diagram of a wavelength selection prism.

That is to say, a configuration in which visible light is incident on the first imaging element 103 and infrared light is incident on the second imaging element 104 is provided. Here, the predetermined threshold value is 600 nm or more and 750 nm or less. That is to say, a boundary between visible light and infrared light is defined as 600 nm or more and 750 nm or less. Furthermore, infrared light means light having a wavelength from the predetermined threshold value to 2500 nm. FIG. 2 is a diagram illustrating an example of a spectral transmission spectrum and a spectral reflection spectrum of the wavelength selection prism. The solid line indicates transmission and the dotted line indicates reflection.

The first imaging element 103 has sensitivity to at least visible light and the second imaging element 104 has sensitivity to at least infrared light. For example, if Si is used as a material for a photoelectric conversion unit, it is possible to realize an imaging element having sensitivity to light with a wavelength of 380 nm or more and a wavelength of 1100 nm or less. Therefore, in the first imaging element 103 and the second imaging element 104, the photoelectric conversion unit may be made of Si. As the first imaging element 103 and the second imaging element 104, for example, a CCD or CMOS type imaging element can be used.

Pixels in the first imaging element 103 include on-chip color filters in an RGB Bayer array, and an image signal in an RGB format output from the first imaging element 103 has both luminance information and color information. On the other hand, an image signal output from the second imaging element 104 has only luminance information. The first imaging element 103 only needs to have a sensitivity distribution mainly with respect to visible light and may also have a sensitivity distribution with respect to light other than visible light. Furthermore, the second imaging element 104 only needs to have a sensitivity distribution mainly with respect to infrared light and may also have a sensitivity distribution with respect to light other than infrared light.

The controller 106 controls driving of the first imaging element 103 and the second imaging element 104 and reading-out of an image signal. That is to say, the controller 106 also sets a frame rate, an accumulation time, and the like in the first imaging element 103 and the second imaging element 104. The controller 106 includes a computer such as a central processing unit (CPU) and a memory. The memory stores a computer program for causing the CPU to execute an operation associated with a flowchart which will be described later. Furthermore, the controller 106 has a built-in drive circuit configured to control operations of various circuits on the basis of an instruction from the CPU.

The combination processor 105 combines a first image signal 107 output from the first imaging element 103 with a second image signal 108A and a third image signal 108B output from the second imaging element 104 and generates a fourth image signal 109. Hereinafter, a plurality of image signals having different exposure conditions output from the second imaging element 104 are collectively referred to as an image signal 108. The second image signal 108A and the third image signal 108B output from the second imaging element 104 are image signals acquired under different exposure conditions. Here, for example, an accumulation time for the second image signal 108A is longer than an accumulation time for the third image signal 108B.

Figure 3:
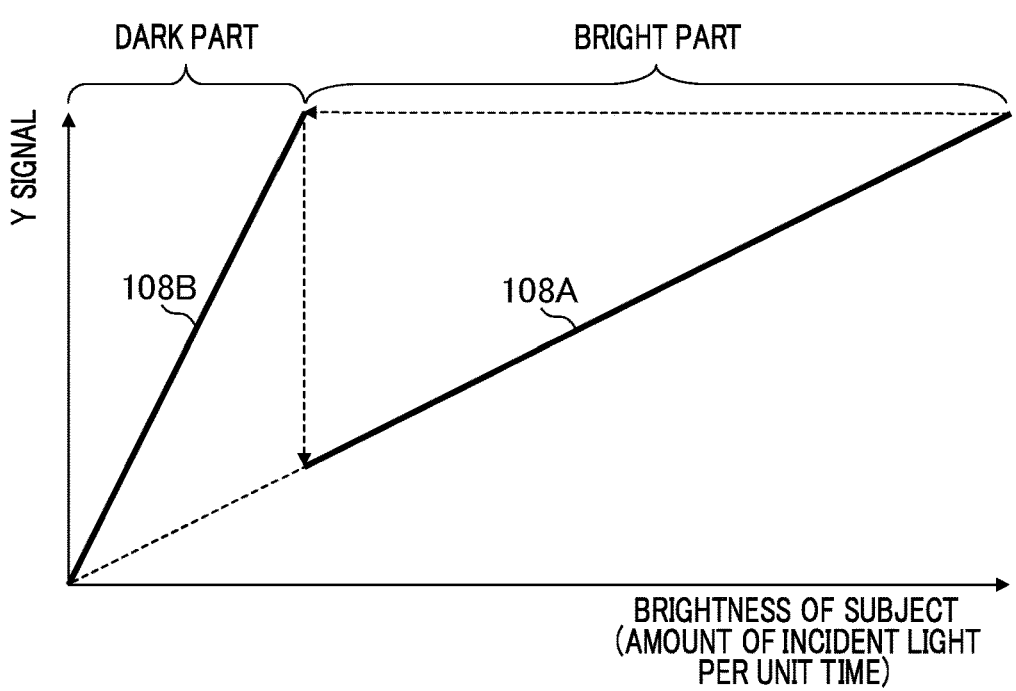
FIG. 3 is a diagram for explaining an example of a method for increasing a dynamic range.

A combining process corresponds to, for example, the following process. First, the second image signal 108A and the third image signal 108B read in a RGB format and acquired in different frames are developed and converted into image signals in a YUV format. (Actually, the second image signal 108A and the third image signal 108B do not have color information and values of U and V are zero.) FIG. 3 is a diagram for explaining an example of a method for increasing a dynamic range. After that, a Y signal having a wide dynamic range is generated using the third image signal 108B for the dark part and the second image signal 108A for the bright part. A Y signal having a wide dynamic range at this time is defined as $Y_2$. Similarly, the first image signal 107 read in a RGB format is demosaiced, developed, and converted into an image signal in a YUV format. YUV signals acquired from the first image signal 107 at this time are defined as $Y_1$, $U_1$, and $V_1$.

Subsequently, the fourth image signal 109 is generated by combining the $Y_1$ signal with the $Y_2$ signal. To be specific, when YUV signals of the fourth image signal 109 are defined as $Y_3$, $U_3$, and $V_3$, the fourth image signal 109 is generated using the following expressions:

$$Y_3 = Y_2 \qquad \text{(Expression 1)}$$

$$U_3 = U_1 \qquad \text{(Expression 2)}$$

$$V_3 = V_1 \qquad \text{(Expression 3).}$$

That is to say, the fourth image signal 109 is generated by combining the color signals ($U_1$, $V_1$) in the first image signal 107 with the luminance signal ($Y_2$) in the second image signal 108A and the third image signal 108B.

Figure 4:
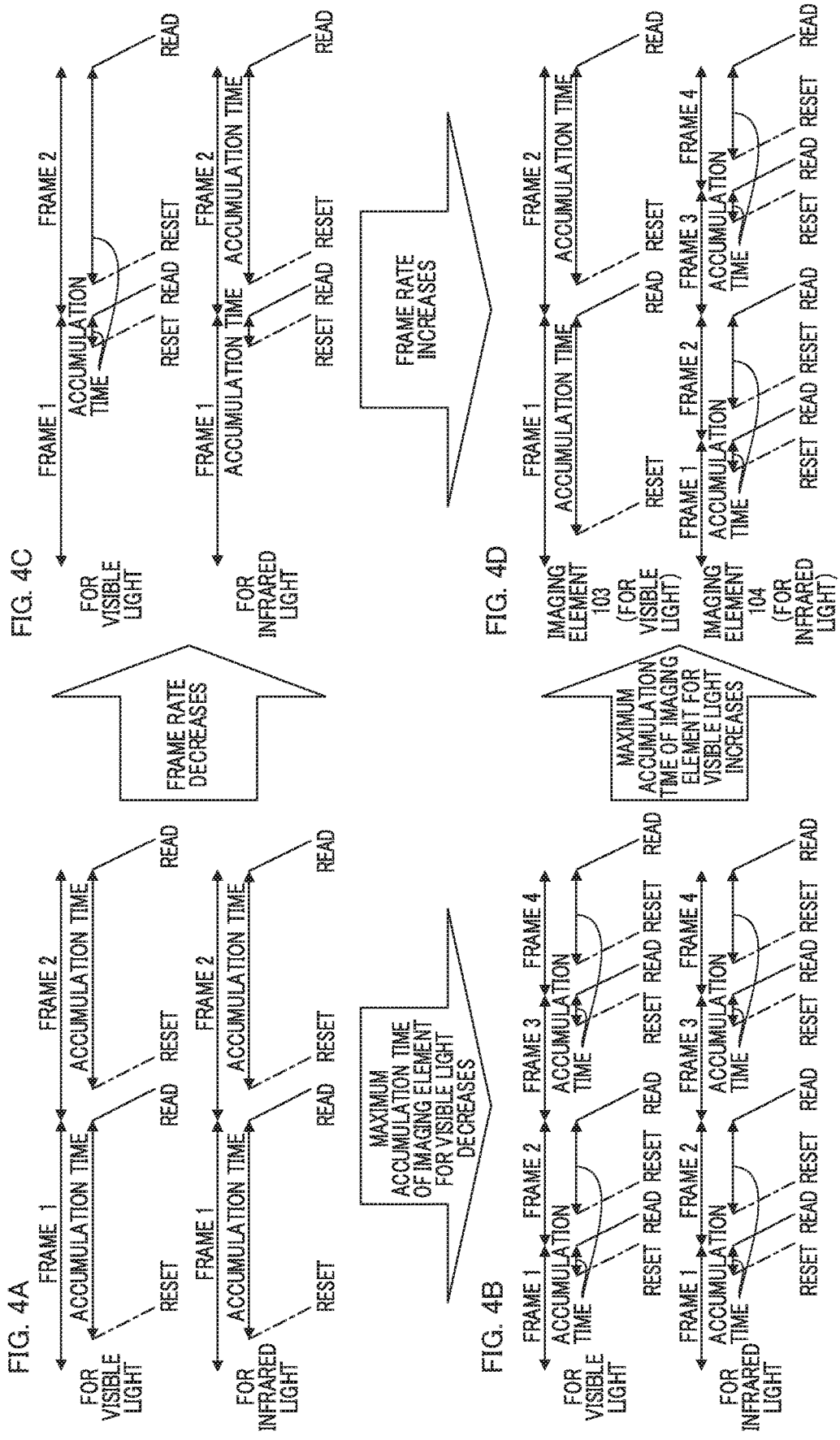
FIG. 4 comprises FIGS. 4A, 4B, 4C, and 4D which are driving timing charts of the imaging device of the first embodiment and a comparative example.

FIGS. 4A, 4B, 4C, and 4D are diagrams for describing a driving timing chart of the first imaging element 103 and the second imaging element 104 of the imaging device 100 in the first embodiment and a driving timing chart of the comparative example. FIG. 4A illustrates Comparative Example 1, FIG. 4B illustrates Comparative Example 2, and FIG. 4C illustrates Comparative Example 3. Comparative Example 1 is an example of a case in which a dynamic range is not increased in any of an image for visible light and an image for infrared light. Comparative Example 2 and Comparative Example 3 are examples of a case in which a dynamic range is increased. A difference between Comparative Example 2 and Comparative Example 3 is that Comparative Example 2 has the same frame rate as in Comparative Example 1, whereas Comparative Example 3 has the same maximum accumulation time of an imaging element for visible light as in Comparative Example 1. FIG. 4D is a timing chart for the imaging device 100 in the embodiment.

As can be seen through a comparison between FIG. 4A and FIG. 4B, if a dynamic range of an image is increased without reducing a frame rate as compared with Comparative Example 1, a maximum accumulation time of an imaging element for visible light is reduced.

Since an S/N ratio of an image signal decreases when an amount of light incident on an image decreases, if a maximum accumulation time of an imaging element for visible light is reduced, an S/N ratio of the first image signals ($Y_1$, $U_1$, and $V_1$) at the time of low illuminance decreases. As a result, as can be seen from (Expression 1) to (Expression 3), an S/N ratio between color difference signals ($U_3$, $V_3$) of a combined fourth image decreases. That is to say, an image quality under lower illumination is reduced.

As can be seen through a comparison between FIG. 4A and FIG. 4C, if a dynamic range of an image is increased without reducing a maximum accumulation time as compared with Comparative Example 1, a frame rate decreases. As a result, an image quality when a fast-moving subject is captured deteriorates.

In this way, when a technique of increasing a dynamic range is combined with the comparative example 1, an image quality deteriorates when a fast-moving subject is captured under low illuminance.

On the other hand, in the imaging device 100 in the embodiment, a dynamic range is increased using a plurality of frames in the second imaging element 104 while a maximum accumulation time is maintained in the first imaging element 103. Thus, a dynamic range of an image can be increased while a decrease in image quality when a fast-moving subject is captured under low illuminance is minimized. A detailed description will be provided below.

Here, driving of the imaging device 100 according to the embodiment will be described. FIG. 4D is a driving timing chart for the imaging device 100 in the embodiment. As can be seen from FIG. 4D, in the imaging device 100 in the embodiment, different driving modes are used for the first imaging element 103 and the second imaging element 104.

The first imaging element 103 for visible light is driven at the same frame rate and the same maximum accumulation time as in Comparative Example 1. As described above, the S/N ratio of the color difference signals ($U_3$, $V_3$) of the combined fourth image signal 109 is determined using the maximum accumulation time of the first imaging element 103. Therefore, the imaging device 100 in the embodiment illustrated in FIG. 4D does not cause a decrease in the S/N ratio of the color difference signals as compared with Comparative Example 1 illustrated in FIG. 4A. Furthermore, the imaging device 100 in the embodiment illustrated in FIG. 4D can acquire the color difference signals ($U_3$, $V_3$) at the same frame rate as in the imaging device in Comparative Example 1 illustrated in FIG. 4A.

On the other hand, the second imaging element 104 for infrared light divides signals of one frame into two frames and is driven so that the second image signal 108A and the third image signal 108B having different accumulation times are acquired for each frame. Moreover, when these signals are combined, a Y signal ($Y_2$) having a wide dynamic range is generated for each frame in FIG. 4A. As can be seen from (Expression 1), since the luminance signal ($Y_3$) of the combined fourth image signal 109 matches $Y_2$, it is possible to acquire a luminance signal ($Y_3$) having a wide dynamic range for each frame in FIG. 4A.

As described above, the imaging device 100 in the embodiment illustrated in FIG. 4D, it is possible to acquire a luminance signal ($Y_3$) having a wide dynamic range and color difference signals ($U_3$, $V_3$) at the same frame rate as in the imaging device in Comparative Example 1 illustrated in FIG. 4A. That is to say, the imaging device 100 in the embodiment illustrated in FIG. 4D can minimize a decrease in frame rate as compared with the imaging device in Comparative Example 1 illustrated in FIG. 4A.

Figure 5:
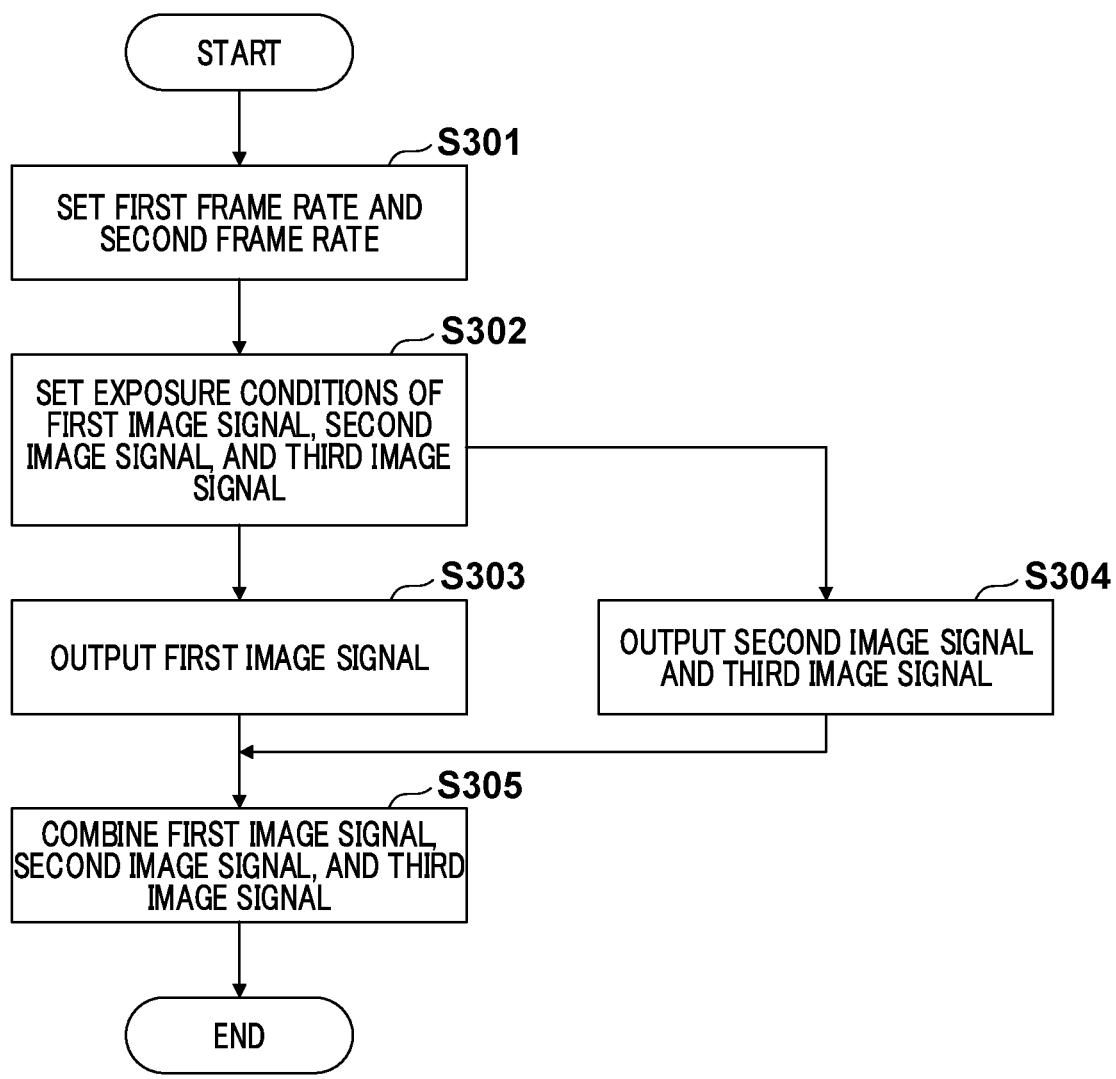
FIG. 5 is a flowchart for describing an operation in the first embodiment.

FIG. 5 is a flowchart for describing an operation in the first embodiment. Each operation (step) illustrated in the flowchart can be performed using the controller 106. First, in S301, the controller 106 sets a frame rate (a first frame rate) when an image signal is acquired from the first imaging element 103 and a frame rate (a second frame rate) when an image signal is acquired from the second imaging element 104. The second frame rate is set to be higher than the first frame rate. Here, as described above, two frames are set for one frame of the first frame rate, that is, the second frame rate is set to be twice the first frame rate.

Subsequently, in S302, the controller 106 sets exposure conditions for each of the first image signal 107, the second image signal 108A, and the third image signal 108B. Here, different accumulation times are set. As described above, if a maximum accumulation time of the imaging element for visible light is reduced, the S/N ratio of the color difference signals ($U_3$, $V_3$) of the combined fourth image is reduced. For this reason, here, a maximum accumulation time of the first image signal 107 is set longer. With regard to the second image signal 108A and the third image signal 108B, an accumulation time of the second image signal 108A is set longer than an accumulation time of the third image signal 108B.

In order not to cause a decrease in S/N ratio of color difference signals, it is desirable that a maximum accumulation time of the first imaging element 103 corresponds to one frame of the imaging device in Comparative Example 1 illustrated in FIG. 4A. However, in order to minimize a decrease in S/N ratio of color difference signals, the maximum accumulation time of the first imaging element 103 may be shorter than one frame of the imaging device in Comparative Example 1. To be specific, as can be seen through a comparison between FIG. 4B and FIG. 4D, in order to improve an S/N ratio of color difference signals as compared with the imaging device illustrated in FIG. 4B, the maximum accumulation time of the first imaging element 103 has only to be made longer than the reciprocal of the second frame rate.

Referring to FIG. 5 again, after that, in S303, the first image signal 107 is output from the first imaging element 103. Furthermore, in parallel with such a step, in S304, the second image signal 108A and the third image signal 108B having different accumulation times are output from the second imaging element 104.

In S305, the combination processor 105 combines the first image signal 107 output from the first imaging element 103 with the second image signal 108A and the third image signal 108B output from the second imaging element 104. Thus, the fourth image signal 109 having a wide dynamic range is generated.

In this way, the imaging device 100 in the embodiment can increase a dynamic range of an image while minimizing a decrease in image quality when a fast-moving subject is capture under low illuminance.

In the second imaging element 104, although image signals of two frames (two types) having different accumulation times are used in the embodiment, image signals of three frames (three types) or more having different accumulation times may be used. When the number of types of image signals used for combination increases, it is possible to increase a dynamic range. Thus, it is desirable to increase the number of types of image signals used for combination. When image signals corresponding to integer (N) frames among image signals output from the second imaging element 104 are used for one combined image, a frame rate of the second imaging element 104 is integer (N) times a frame rate of the first imaging element 103. Moreover, in the second imaging element 104, accumulation times of integer (N) types are used. In addition, image signals of integer (N) types are acquired from the second imaging element 104. In other words, the second imaging element 104 acquires a plurality of image signals including the second image signal 108A and the third image signal 108B through one frame of the first imaging element 103.

Second Embodiment

Figure 6:
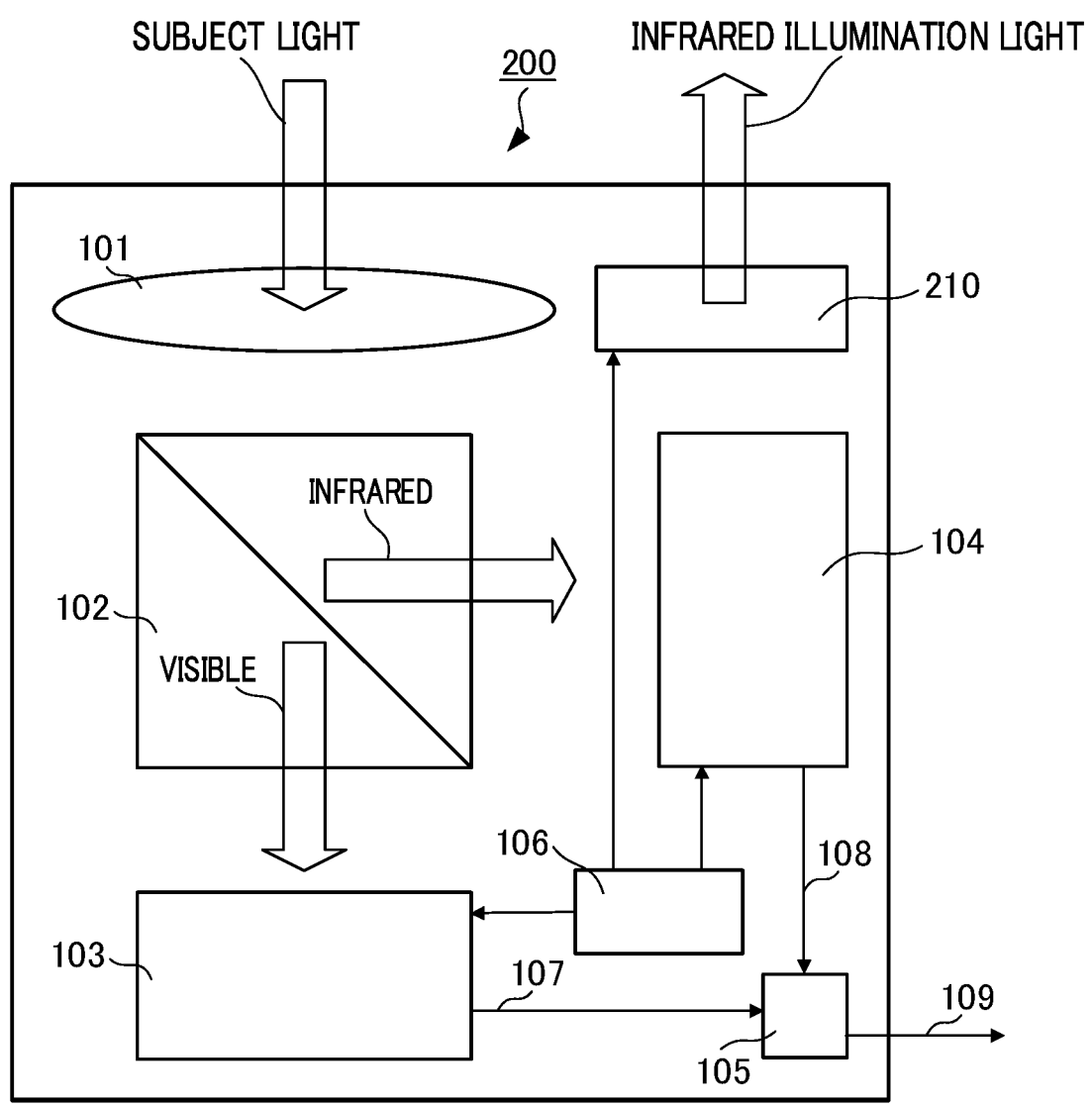
FIG. 6 is a schematic diagram illustrating a configuration of an imaging device according to the second embodiment.

An imaging device 200 in the second embodiment and the imaging device 100 illustrated in the first embodiment are different in that the imaging device 200 includes an infrared illumination unit 210 which radiates infrared light. FIG. 6 is a schematic diagram illustrating a configuration of the imaging device 200 according to the second embodiment. The imaging device 200 includes an imaging optical system 101, a light separating unit 102, a first imaging element 103, a second imaging element 104, a combination processor 105, a controller 106, and an infrared illumination unit 210. The infrared illumination unit 210 is a light source configured to radiate infrared light and is, for example, a light emitting diode (LED) made of a compound semiconductor such as AlGaAs. It is possible to improve image quality in a low illuminance environment by radiating infrared light using the infrared illumination unit 210.

Also, in the imaging device 100 in the first embodiment, as a method for making exposure conditions between a plurality of frames of the second imaging element 104 different from each other, although lengths of accumulation times are controlled, the imaging device 200 makes exposure conditions different from each other using different methods. In the imaging device 200, exposure conditions are made different from each other by controlling a magnitude of an output of the infrared illumination unit 210 between the plurality of frames of the second imaging element 104.

Figure 7A:
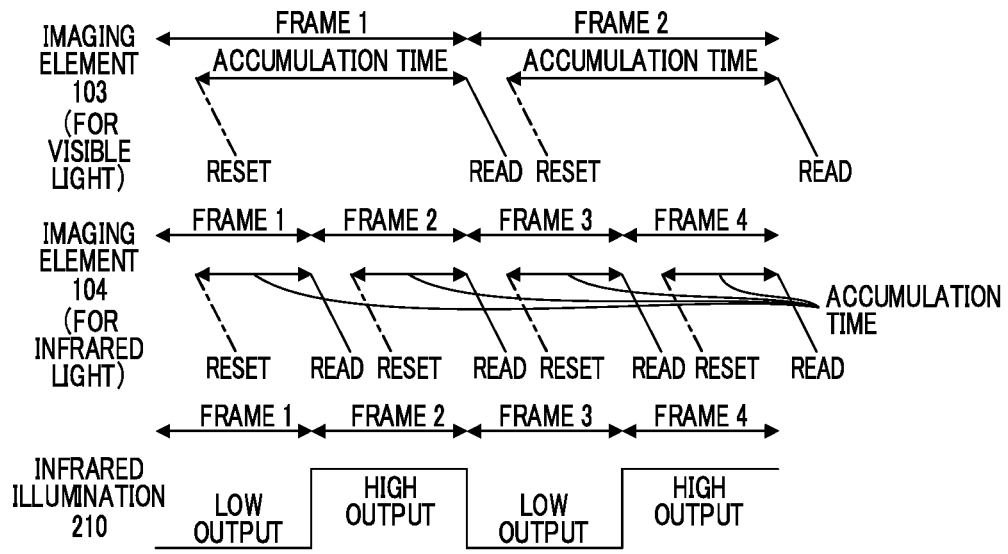
FIGS. 7A and 7B are diagrams illustrating an example of a driving timing chart for the imaging device in the second embodiment.
Figure 7B:
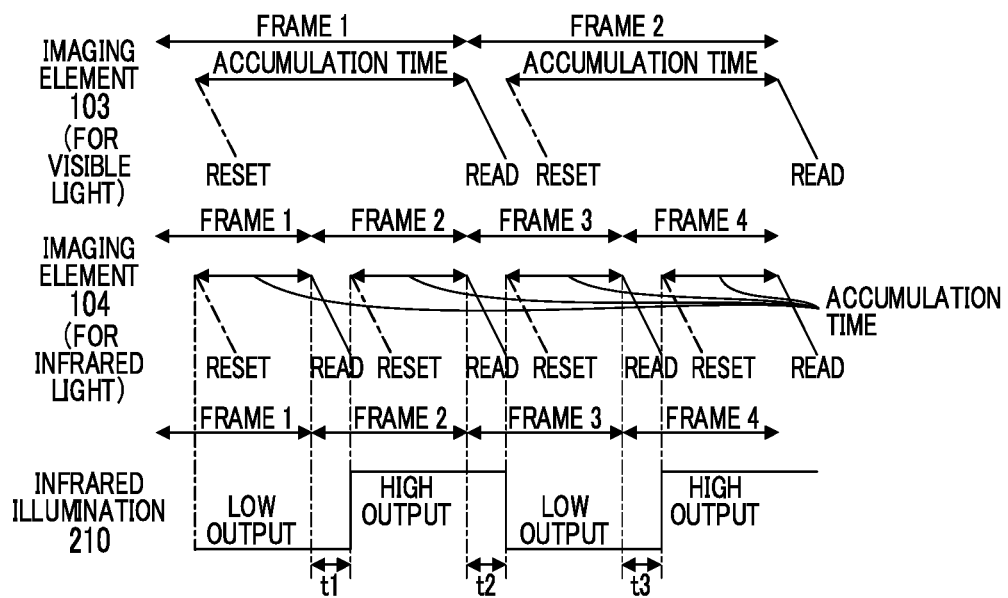

FIGS. 7A and 7B are diagrams illustrating an example of a driving timing chart for the first imaging element 103, the second imaging element 104, and the infrared illumination unit 210 in the imaging device 200 in the second embodiment. In FIG. 7A, the output of the infrared illumination unit 210 is changed between the plurality of frames in the second imaging element 104. That is to say, an output of the infrared illumination unit 210 during an accumulation time of the second image signal 108A is made different from an output of the infrared illumination unit 210 during an accumulation time of the third image signal 108B. Here, for example, the output of the infrared illumination unit 210 during the accumulation time of the second image signal 108A is smaller than the output of the infrared illumination unit 210 during the accumulation time of the third image signal 108B. Moreover, in the bright part, the second imaging element 104 uses the second image signal 108A acquired in a frame in which the output of the infrared illumination unit 210 is relatively small. In the dark part, the third image signal 108B acquired in a frame in which the output of the infrared illumination unit 210 is relatively large is used.

In this way, image signals having a wide dynamic range (the second image signal 108A and the third image signal 108B) output from the second imaging element 104 are acquired. Furthermore, it is possible to generate the fourth image signal 109 having a wide dynamic range by combining the second image signal 108A and the third image signal 108B with the first image signal 107 acquired using the first imaging element 103.

When the output of the infrared illumination unit 210 is turned off, it can be interpreted that the output has been changed to 0. Thus, exposure conditions between a plurality of frames may be varied by controlling the turning on/off of the output of the infrared illumination unit 210.

Also, in FIG. 7A, although the start and end of each frame and a timing of changing the magnitude of the output of the infrared illumination unit 210 overlap, the start and end of each frame and a timing of changing the magnitude of the output of the infrared illumination unit 210 may not overlap and the output of the infrared illumination unit 210 may be changed in each frame of the second imaging element 104. Here, in order to minimize the occurrence of a flash band, it is desirable that the output of the infrared illumination unit 210 is constant during the accumulation time of the second imaging element 104. Here, the fact that the output is constant means that the fluctuation of the output is 50% or less in RMS with respect to the original output.

FIG. 7B illustrates a specific driving timing chart. In FIG. 7B, a timing at which the output of the infrared illumination unit 210 is changed matches the start and end of the accumulation time. It is desirable that the output of the infrared illumination unit 210 is constant during the accumulation time. For this reason, in the second imaging element 104, it is desirable that the output of the infrared illumination unit 210 is changed in periods t1 to t3 from the time of end of the accumulation time of the frame to the time of start of an accumulation time of the next frame. To be specific, first, in the second imaging element 104, the output of the infrared illumination unit 210 is changed in a period t1 from the time of end of an accumulation time (an accumulation time of the second image signal 108A) of frame 1 to the time of start of an accumulation time (an accumulation time of the third image signal 108B) of frame 2 which is the next frame. Subsequently, the output of the infrared illumination unit 210 is changed in a period t2 from the time of end of an accumulation time (an accumulation time of the third image signal 108B) of frame 2 to the time of start of an accumulation time (an accumulation time of the second image signal 108A) of frame 3 which is the next frame. Furthermore, the output of the infrared illumination unit 210 is changed again in a period t3 from the time of end of an accumulation time (an accumulation time of the second image signal 108A) of frame 3 to the time of start of an accumulation time (an accumulation time of the third image signal 108B) of frame 4 which is the next frame.

In a case in which an exposure condition is varied using the output of the infrared illumination unit 210, it is desirable that electric charge is not accumulated into the first imaging element 103 when the output of the infrared illumination unit 210 is relatively large and the electric charge be accumulated into the first imaging element 103 only when the output of the infrared illumination unit 210 is relatively small. The reason will be described below.

As can be seen from FIG. 2, most of infrared light which has passed through the light separating unit 102 is reflected, but a part of the infrared light is transmitted. Infrared light which has been transmitted through the light separating unit 102 is incident on each pixel of the first imaging element 103. That is to say, when electric charge is accumulated into the first imaging element 103 in a state in which the output of the infrared illumination unit 210 is large, a part of light emitted from the infrared illumination unit 210 is likely to be incident on each pixel of the first imaging element 103.

Here, although there is a request concerning the sensitivity to visible light for pixels of each color of the first imaging element 103, there is no request concerning the sensitivity to infrared light. For this reason, generally, in the sensitivity of a solid-state imaging device for acquiring visible light, in a wavelength band of infrared light, a read pixel, a green pixel, and a blue pixel are substantially the same. For this reason, when a part of light emitted from the infrared illumination unit is incident on each pixel in the first imaging element 103, the output of the green pixel is relatively small, the outputs of the red pixels and the blue pixels are relatively high, and a magenta color is strong in the first image signal 107. As shown in (Expression 1) to (Equation 3), color difference signals ($U_3$, $V_3$) of the fourth image signal 109 match color difference signals ($U_1$, $V_1$) of the first image signal 107. As a result, in the fourth image signal 109, a magenta color is strong.

As described above, when charge is accumulated into the first imaging element 103 in a state in which the output of the infrared illumination unit 210 is large, a magenta color of the generated fourth image signal 109 is relatively strong. For this reason, it is desirable that electric charge is accumulate into the first imaging element 103 only when the output of the infrared illumination unit 210 is relatively small.

Figure 8A:
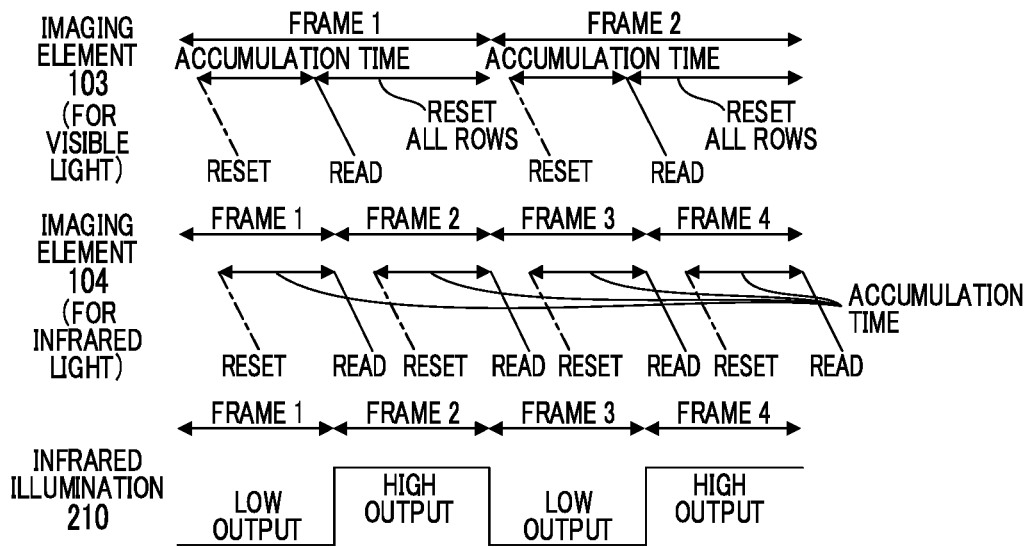
FIGS. 8A and 8B are diagrams illustrating another example of the driving timing chart for the imaging device in the second embodiment.
Figure 8B:
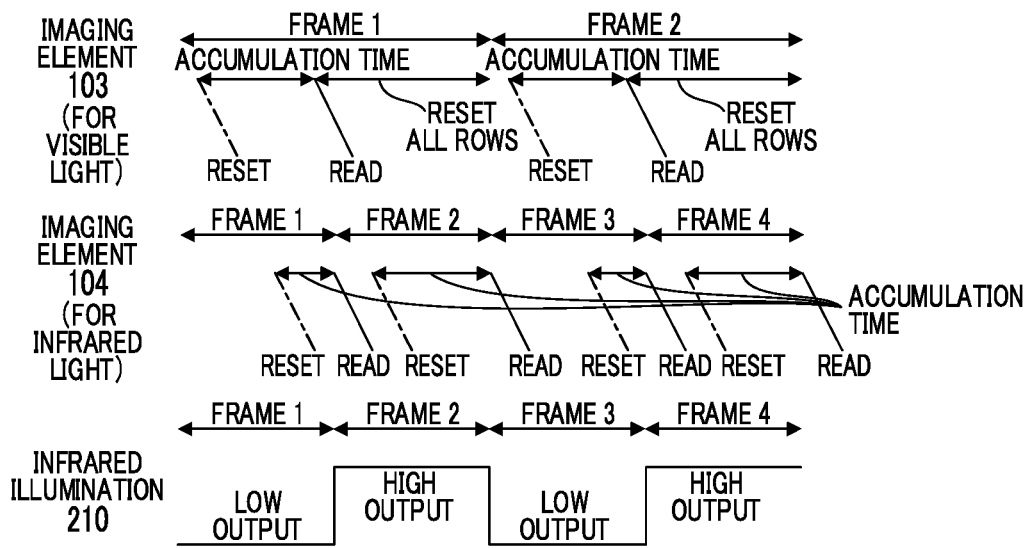

A specific driving timing chart will be described. FIGS. 8A and 8B are diagrams illustrating another example of the driving timing chart of the first imaging element 103, the second imaging element 104, and the infrared illumination unit 210 in the imaging device 200. In FIG. 8A, when the output of the infrared illumination unit 210 is relatively small, electric charge is accumulated into the first imaging element 103. Here, a timing at which the output of the infrared illumination unit 210 is relatively small corresponds to a timing corresponding to frame 1 and frame 3 in the second imaging element 104 in FIG. 8A. On the other hand, when the output of the infrared illumination unit 210 is relatively large, all of the pixels in the first imaging element 103 are kept reset so that electric charge is not accumulate. Here, a timing at which the output of the infrared illumination unit 210 is relatively large corresponds to a timing corresponding to frame 2 and frame 4 in the second imaging element 104 in FIG. 8A.

When image signals of three frames (three types) or more whose outputs of the infrared illumination unit 210 are different from each other are used in the second imaging element 104, for example, a threshold value for the outputs of the infrared illumination unit 210 may be provided. Electric charge may be accumulated into the first imaging element 103 only when the output of the infrared illumination unit 210 is less than a threshold value.

Also, FIG. 8A illustrates a case in which an accumulation time of the first imaging element 103 is equal to an accumulation time of the second imaging element 104 when the output of the infrared illumination unit 210 is relatively small. However, at this time, an accumulation time of the first imaging element 103 may be different from an accumulation time of the second imaging element 104.

FIG. 8B illustrates an example. In FIG. 8B, when the output of the infrared illumination unit 210 is relatively small (at a timing corresponding to frame 1 and frame 3 in the second imaging element 104), an accumulation time of the second imaging element 104 is shorter than an accumulation time of the first imaging element 103. In this way, when images of different accumulation times are acquired in the same frame and the images are compared, it is possible to acquire motion information of a subject.

As illustrated in FIG. 8, it is possible to prevent a magenta color of the fourth image signal 109 from becoming strong when electric charge is accumulated into the first imaging element 103 only when the output of the infrared illumination unit 210 is relatively small. On the other hand, as illustrated in FIG. 7, in a case in which electric charge is accumulated into both of the first imaging element 103 and the second imaging element 104 when the outputs of the infrared illumination unit 210 are large and small, an electric charge accumulation time of the first imaging element 103 is long. Thus, an S/N ratio of color difference signals is improved. Therefore, when the infrared illumination unit 210 is used, a selection concerning whether to select the driving mode in FIG. 7 or to select the driving mode in FIG. 8 may be changed depending on whether any of the maintaining of a color balance and the S/N ratio of color difference signals is important.

Figure 9:
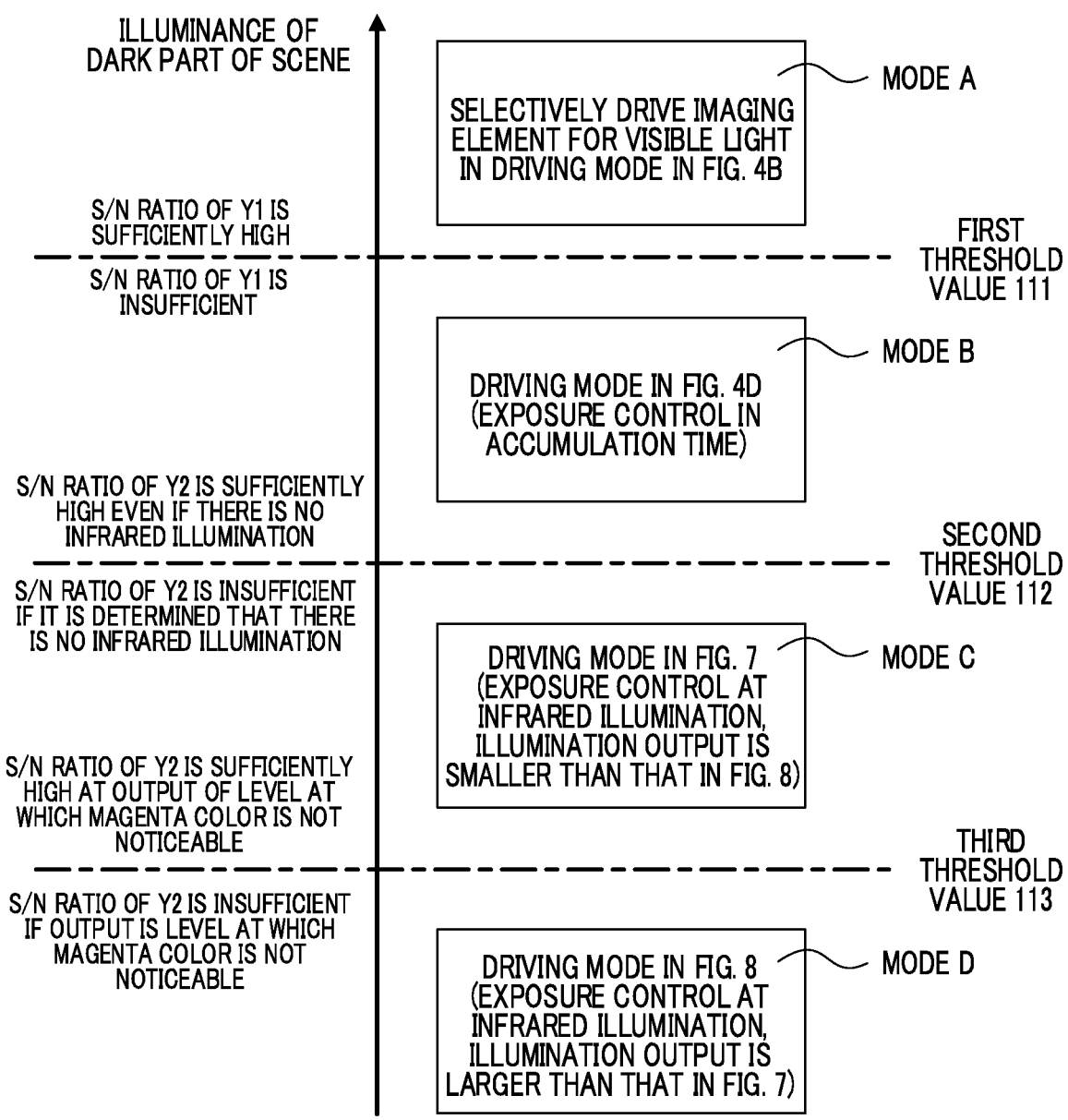
FIG. 9 is a diagram illustrating an example of a reference used for changing a driving mode.

FIG. 9 is a diagram illustrating an example a reference for changing a driving mode. In FIG. 9, the controller 106 switches the driving mode in accordance with the illuminance of the subject. The illuminance of the subject can be obtained from a brightness value $(Y_1)$ of the first image signal 107 and an exposure condition (a so-called EV value) of the first imaging element.

First, when the illuminance is equal to or larger than a first threshold value 111, an S/N ratio of a luminance signal $(Y_1)$ of a first image is sufficiently high. Therefore, an image having a wide dynamic range may be generated by driving only the first imaging element 103 in the driving mode in FIG. 4B, combining first image signals in a plurality of frames having different exposure conditions. This corresponds to mode A in FIG. 9. In mode A, there is no need to drive the second imaging element 104. Furthermore, there is no need to combine an image signal (the first image signal 107) output from the first imaging element 103 with an image signal (the second image signal 108A or the third image signal 108B) output from the second imaging element 104. That is to say, in mode A, a dynamic range is increased by driving only the first imaging element 103 and combining first image signals of a plurality of types having different exposure conditions.

A case in which the illuminance decreases less than the first threshold value 111 and an S/N ratio of a luminance signal $(Y_1)$ output from the first imaging element 103 is insufficient will be described. In this case, a luminance signal $(Y_2)$ output from the second imaging element 104 is combined with color difference signals $(U_1, V_1)$ output from the first imaging element 103. Thus, it is desirable to improve an S/N ratio of luminance signal. Here, if the infrared illumination unit 210 is used, there may be a trade-off between maintaining the color balance and the S/N ratio of the color difference signal in some cases. For this reason, if a luminance signal $(Y_2)$ having a sufficient S/N ratio can be obtained from the second imaging element 104 without using the infrared illumination unit 210, it is desirable not to use the infrared illumination unit 210.

Therefore, when the illuminance is equal to or larger than a second threshold value 112 which is smaller than the first threshold value 111, the driving mode in FIG. 4D is used. This corresponds to mode B in FIG. 9. In mode B, image signals (here, the second image signal 108A and the third image signal 108B) acquired under exposure conditions having different accumulation times are acquired from the second imaging element 104 without using the infrared illumination unit 210.

If the illuminance decreases less than the second threshold value 112 and the infrared illumination unit 210 is not used, when a luminance signal $(Y_2)$ of an image having a sufficient S/N ratio is not obtained from the second imaging element 104, the infrared illumination unit 210 is used. Here, since a problem that a magenta color is stronger easily occurs when the output of the infrared illumination unit 210 increases, it is desirable that the output of the infrared illumination unit 210 is minimized to a necessity minimum.

Therefore, when the illuminance is equal to or larger than a third threshold value 113 which is smaller than the second threshold value 112, the driving mode in FIG. 7 is used with emphasis on an S/N ratio of a color difference signal. This corresponds to mode C in FIG. 9. In mode C, an exposure condition is controlled using a magnitude of the output of the infrared illumination unit 210 and electric charge is accumulated into the first imaging element 103 both when the output of the infrared illumination unit 210 is relatively large and when the output of the infrared illumination unit 210 is relatively small.

When the illuminance is less than the third threshold value 113, in order to obtain a luminance signal $(Y_2)$ having a sufficient S/N ratio from the second imaging element 104, the output of the infrared illumination unit 210 at a level at which a magenta color is strong and disruption of a color balance is noticeable is required. For this reason, the driving mode in FIG. 8 is used. This corresponds to mode D in FIG. 9. In mode D, an exposure condition is controlled using a magnitude of the output of the infrared illumination unit 210. In mode D, when the output of the infrared illumination unit 210 is relatively large, electric charge is not accumulated into the first imaging element 103, and only when the output of the infrared illumination unit 210 is relatively small, electric charge is accumulated into the first imaging element 103.

Figure 10:
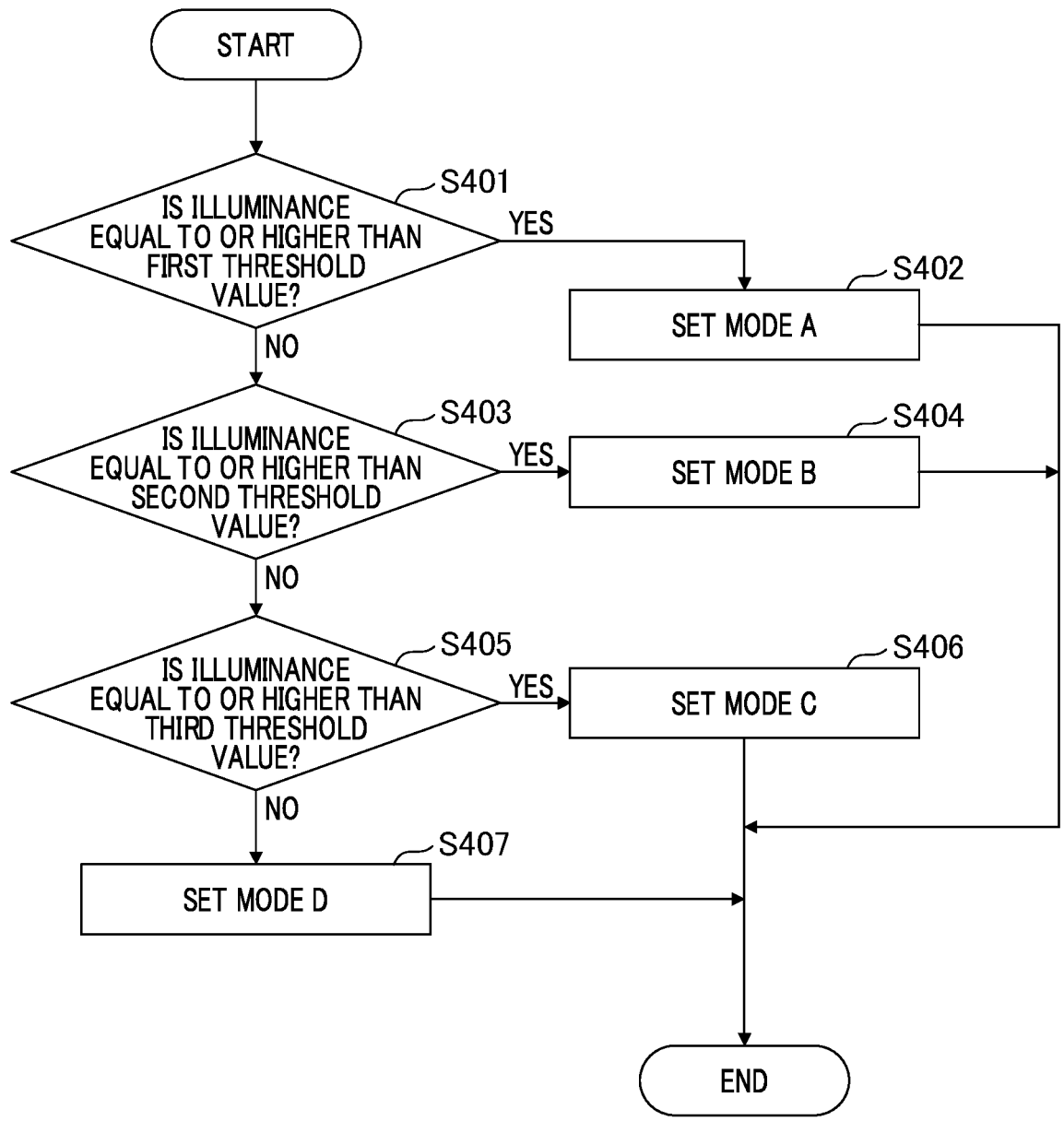
FIG. 10 is a flowchart for describing an example of a mode setting process.

FIG. 10 is a flowchart for describing an example of a mode setting process. Each operation (step) in the flowchart can be performed using the controller 106. First, in S401, the controller 106 determines whether the illuminance is equal to or larger than the first threshold value. When it is determined that the illuminance is equal to or larger than the first threshold value (Yes), the controller 106 sets mode A in S402. When it is determined that the illuminance is less than the first threshold value (S401, No), the controller 106 determines whether the illuminance is equal to or larger than the second threshold value which is smaller than the first threshold value in S403. When it is determined that the illuminance is equal to or larger than the second threshold value (Yes), the controller 106 sets mode B in S404. When it is determined that the illuminance is less than the second threshold value (S403, No), the controller 106 determines whether the illuminance is equal to or larger than the third threshold value which is smaller than the second threshold value in S405. When it is determined that the illuminance is equal to or larger than the third threshold value (Yes), the controller 106 sets mode C in S406. When it is determined that the illuminance is less than the third threshold value (S405, No), the controller 106 sets mode C in S407.

According to the above-described flow, it is possible to select an appropriate mode in accordance with the illuminance. When the illuminance is high, it is possible to acquire an image having high image quality and it is possible to increase a dynamic range of an image while minimizing a decrease in image quality when a fast-moving subject is captured under low illuminance.

In mode C and mode D, the control of a magnitude of the output of the infrared illumination unit 210 and the control of a length of an accumulation time of the second imaging element 104 may be combined. For example, in the second imaging element 104, an accumulation time for a frame in which the output of the infrared illumination unit 210 is relatively large is made longer than an accumulation time for a frame in which the output of the infrared illumination unit 210 is relatively small. Thus, it is possible to further increase a dynamic range as compared with a case in which only a magnitude of the output of the infrared illumination unit 210 is controlled.

Also, although a case in which the imaging device 200 automatically switches the driving mode in accordance with the illuminance of the subject has been described in the embodiment, a user may select the driving mode. Alternatively, the user may control a magnitude of the output of the infrared illumination unit 210 and switch the driving mode in accordance with the output thereof. In this case, an interface in which the user sets a magnitude of the output of the infrared illumination unit 210 may be provided, mode C may be selected when the output of the infrared illumination unit 210 is equal to or more than a predetermined output, and mode D may be selected when the output of the infrared illumination unit 210 is less than a predetermined output.

Embodiment of Imaging System

Figure 11:
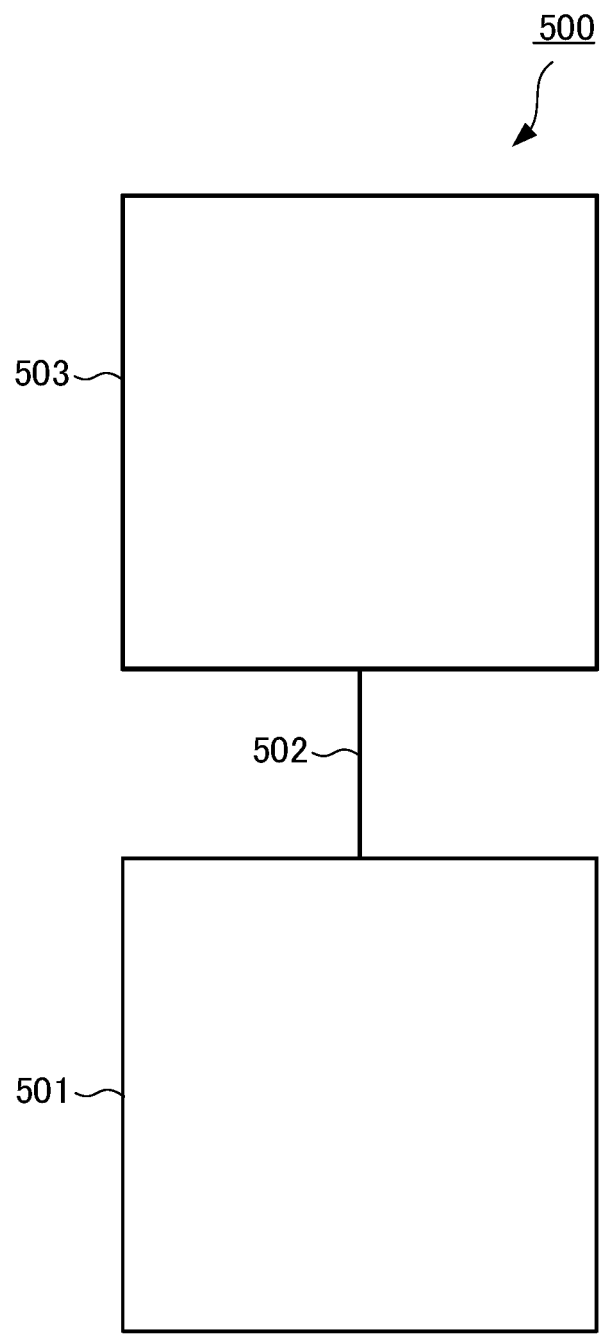
FIG. 11 is a configuration diagram of a monitoring system using an imaging device.

In this embodiment, a monitoring system (an imaging system) using the imaging device illustrated in the first embodiment will be described. FIG. 11 is a configuration diagram of a monitoring system 500 using an imaging device 503. As the imaging device 503 used for the monitoring system 500, any of the imaging devices according to the first embodiment and the second embodiment may be used.

The imaging device 503 and a client device 501 may be connected to each other over a network 502 in a state in which the imaging device 503 can communicate with the client device 501. The client device 501 (an information processing device) transmits various commands for controlling the imaging device 503. The imaging device 503 receives the various commands and transmits responses to the commands and data of the captured image to the client device 501. The user can select imaging parameters of the imaging device 503 using the client device 501.

The client device 501 is, for example, an external device such as a personal computer (PC) and a smartphone and the network 502 can be constituted of a wired LAN, a wireless LAN, or the like. Furthermore, a configuration in which electric power is supplied to the imaging device 503 over the network 502 may be provided.

Other Embodiments

Although a configuration in which light having different spectral characteristics is guided to the first imaging element and the second imaging element using the light separating unit 102 has been provided in the above-described embodiments, for example, filters having different spectral characteristics may be disposed in front of each of the first imaging element and the second imaging element. Furthermore, the first imaging element and the second imaging element may be of a twin-lens type in which light passing through independently separate optical systems without passing through the light separating unit 102 is received. In addition, in the first imaging element and the second imaging element, for example, an element in which pixels in which a spectral characteristic filter for the first imaging element is disposed and pixels in which a spectral characteristic filter for the second imaging element is disposed are alternately disposed in one imaging element may be provided. Moreover, although the light separating unit through which visible light is transmitted and by which infrared light is reflected has been used in FIG. 2, a light separating unit by which visible light is reflected and through which infrared light is transmitted may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-079524, filed Apr. 18, 2019, which is hereby incorporated by reference herein in its entirety.

What is claimed is:

1. An imaging device comprising:
   a first imaging element having sensitivity to visible light and configured to output a first image signal in which an accumulation time per frame of the first image signal is a first period;
   a second imaging element having sensitivity to infrared light and configured to output a second image signal and a third image signal acquired under an exposure condition different from that of the second image signal, wherein the second image signal and the third image signal are acquired at a second frame rate higher than a first frame rate of the first imaging element, wherein a second period that is an accumulation time per frame of the second image signal is longer than a third period that is an accumulation time per frame of the third image signal, and wherein each of the second period and the third period is shorter than the first period; and
   a combination processor configured to generate a fourth image signal in accordance with a combination of (a) the first image signal of the first frame rate output from the first imaging element and (b) the second image signal of the second frame rate and the third image signal of the second frame rate output from the second imaging element.

2. The imaging device according to claim 1, wherein the second frame rate is set to an integral multiple of the first frame rate, and
   wherein the second imaging element acquires a plurality of image signals including the second image signal and the third image signal during one frame of the first imaging element.

3. The imaging device according to claim 1, wherein a maximum accumulation time of the first imaging element is made longer than the reciprocal of the second frame rate.

4. The imaging device according to claim 1, further comprising:
   an infrared illumination unit,
   wherein an output of the infrared illumination unit during an accumulation time of the second image signal is made different from an output of the infrared illumination unit during an accumulation time of the third image signal.

5. The imaging device according to claim 4, wherein, when the output of the infrared illumination unit is relatively small, electric charge is accumulated into the first imaging element, and when the output of the infrared illumination unit is relatively large, electric charge is not accumulated into the first imaging element.

6. The imaging device according to claim 4, wherein the output of the infrared illumination unit during the accumulation time of the second image signal is smaller than the output of the infrared illumination unit during the accumulation time of the third image signal, and
   wherein the accumulation time of the third image signal is longer than the accumulation time of the second image signal.

7. The imaging device according to claim 6, wherein motion information of a subject is acquired by (a) making the accumulation time of the first image signal and the accumulation time of the second image signal different from each other and (b) comparing an image acquired from the first image signal with an image acquired from the second image signal.

8. The imaging device according to claim 4, wherein the outputs of the infrared illumination unit during the accumulation time of the second image signal and the accumulation time of the third image signal are made constant.

9. The imaging device according to claim 1, wherein, when an illuminance is equal to or larger than a first threshold value, an image is generated by combining a plurality of the first image signals having different exposure conditions acquired in a plurality of frames in the first imaging element without driving the second imaging element, and
   wherein when the illumination is less than the first threshold value, the fourth image signal is generated by combining the first image signal, the second image signal, and the third image signal.

10. The imaging device according to claim 9, further comprising:
    an infrared illumination unit,
    wherein, when an illuminance is equal to or larger than a second threshold value which is smaller than the first threshold value, the fourth image signal is generated by combining the first image signal, the second image signal, and the third image signal, and
    wherein when the illuminance is less than the second threshold value, the fourth image signal is generated by making the output of the infrared illumination unit during the accumulation time of the second image signal and the output of the infrared illumination unit during the accumulation time of the third image signal different from each other.

11. The imaging device according to claim 10, wherein, in a case in which the illuminance is equal to or larger than the third threshold value which is smaller than the second threshold value, electric charge is accumulated into the first imaging element in both when the output of the infrared illumination unit is relatively large and when the output of the infrared illumination unit is relatively small, and
    wherein in a case in which the illuminance is less than the third threshold value, when the output of the infrared illumination unit is relatively small, electric charge is accumulated into the first imaging element, and when the output of the infrared illumination unit is relatively large, electric charge is not accumulated into the first imaging element.

12. The imaging device according to claim 1, further comprising:
    an infrared illumination unit; and
    an interface in which a user sets the output of the infrared illumination unit,
    wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

13. The imaging device according to claim 2, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

14. The imaging device according to claim 3, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

15. The imaging device according to claim 4, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

16. The imaging device according to claim 5, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

17. The imaging device according to claim 6, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

18. The imaging device according to claim 7, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

19. The imaging device according to claim 8, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

20. The imaging device according to claim 9, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

21. The imaging device according to claim 10, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

22. The imaging device according to claim 11, further comprising:

an infrared illumination unit; and an interface in which a user sets the output of the infrared illumination unit, wherein, in a case in which the set output of the infrared illumination unit is equal to or larger than a predetermined output, when the output of the infrared illumination unit is relatively small, electric charge is accumulated into the first imaging element, and when the output of the infrared illumination unit is relatively large, electric charge is not accumulated into the first imaging element, and wherein in a case in which the set output of the infrared illumination unit is less than the predetermined output, both when the output of the infrared illumination unit is relatively small and when the output of the infrared illumination unit is relatively large, electric charge is accumulated into the first imaging element.

23. An imaging system comprising:

an imaging device; and an information processing device connected to the imaging device over a network, wherein the imaging device includes:

(1) a first imaging element having sensitivity to visible light and configured to output a first image signal in which an accumulation time per frame of the first image signal is a first period;

(2) a second imaging element having sensitivity to infrared light and configured to output a second image signal and a third image signal acquired under an exposure condition different from that of the second image signal, wherein the second image signal and the third image signal are acquired at a second frame rate higher than a first frame rate of the first imaging element, wherein a second period that is an accumulation time per frame of the second image signal is longer than a third period that is an accumulation time per frame of the third image signal, and wherein each of the second period and the third period is shorter than the first period; and (3) a combination processor configured to generate a fourth image signal in accordance with a combination of (a) the first image signal of the first frame rate output from the first imaging element and (b) the second image signal of the second frame rate and the third image of the second frame rate signal output from the second imaging element.

24. A non-transitory storage medium on which is stored a computer program for making a computer execute a method for an imaging device comprising (1) a first imaging element having sensitivity to visible light and configured to output a first image signal in which an accumulation time per frame of the first image signal is a first period and (2) a second imaging element having sensitivity to infrared light and configured to output a second image signal and a third image signal acquired under an exposure condition different from that of the second image signal, wherein the second image signal and the third image signal are acquired at a second frame rate, the method comprising:

setting a second frame rate of the second imaging element higher than a first frame rate of the first imaging element, wherein a second period that is an accumulation time per frame of the second image signal is longer than a third period that is an accumulation time per frame of the third image signal, and wherein each of the second period and the third period is shorter than the first period; and generating a fourth image signal in accordance with a combination of (a) the first image signal of the first frame rate output from the first imaging element and (b) the second image signal of the second frame rate and the third image signal of the second frame rate output from the second imaging element.

25. A control method for an imaging device comprising (1) a first imaging element having sensitivity to visible light and configured to output a first image signal in which an accumulation time per frame of the first image signal is a first period and (2) a second imaging element having sensitivity to infrared light and configured to output a second image signal and a third image signal acquired under an exposure condition different from that of the second image signal, wherein the second image signal and the third image signal are acquired at a second frame rate, the method comprising:
- setting a second frame rate of the second imaging element higher than a first frame rate of the first imaging element, wherein a second period that is an accumulation time per frame of the second image signal is longer than a third period that is an accumulation time per frame of the third image signal, and wherein each of the second period and the third period is shorter than the first period; and
- generating a fourth image signal in accordance with a combination of (a) the first image signal of the first frame rate output from the first imaging element and (b) the second image signal of the second frame rate and the third image signal of the second frame rate output from the second imaging element.

\* \* \* \* \*